United States Patent [19]
Hudson

[11] 4,171,190
[45] Oct. 16, 1979

[54] BLOWER MOTOR MOUNTING ASSEMBLY

[75] Inventor: James N. Hudson, Fort Worth, Tex.

[73] Assignee: Molded Products Company, Fort Worth, Tex.

[21] Appl. No.: 896,085

[22] Filed: Apr. 13, 1978

Related U.S. Application Data

[63] Continuation of Ser. No. 730,858, Nov. 8, 1976, abandoned.

[51] Int. Cl.² ............................................. H02K 5/24
[52] U.S. Cl. .................................... 417/350; 417/363; 248/638; 310/51
[58] Field of Search ................. 417/363, 350; 310/51; 248/15, 21

[56] References Cited

U.S. PATENT DOCUMENTS

| | | | |
|---|---|---|---|
| 2,127,979 | 8/1938 | Loftis | 310/51 X |
| 2,717,748 | 9/1955 | Martinet | 417/363 X |
| 2,885,142 | 5/1959 | Eberhart | 417/363 |
| 2,936,141 | 5/1960 | Rapata | 310/51 UX |
| 3,143,284 | 8/1964 | Lindsjo et al. | 310/51 UX |
| 3,323,763 | 6/1967 | Butts | 310/51 UX |
| 3,874,191 | 4/1975 | Hudson | 62/426 |

*Primary Examiner*—Carlton R. Croyle
*Assistant Examiner*—R. E. Gluck
*Attorney, Agent, or Firm*—Wofford, Fails & Zobal

[57] ABSTRACT

A blower motor mounted in a housing with the use of two end supports which act as shock absorbers and positioning devices. Each end support is formed of relatively soft flexible material and comprises a cup shaped member adapted to be attached to an end of the motor. Extending radially outward from the cup shaped member are a plurality of spaced apart legs adapted to engage the wall of the housing. Each leg comprises two spaced apart leg members which diverge outward from each other and a flexible arcuate bridge portion connecting the outer ends of the leg members for engaging the wall of the housing.

3 Claims, 3 Drawing Figures

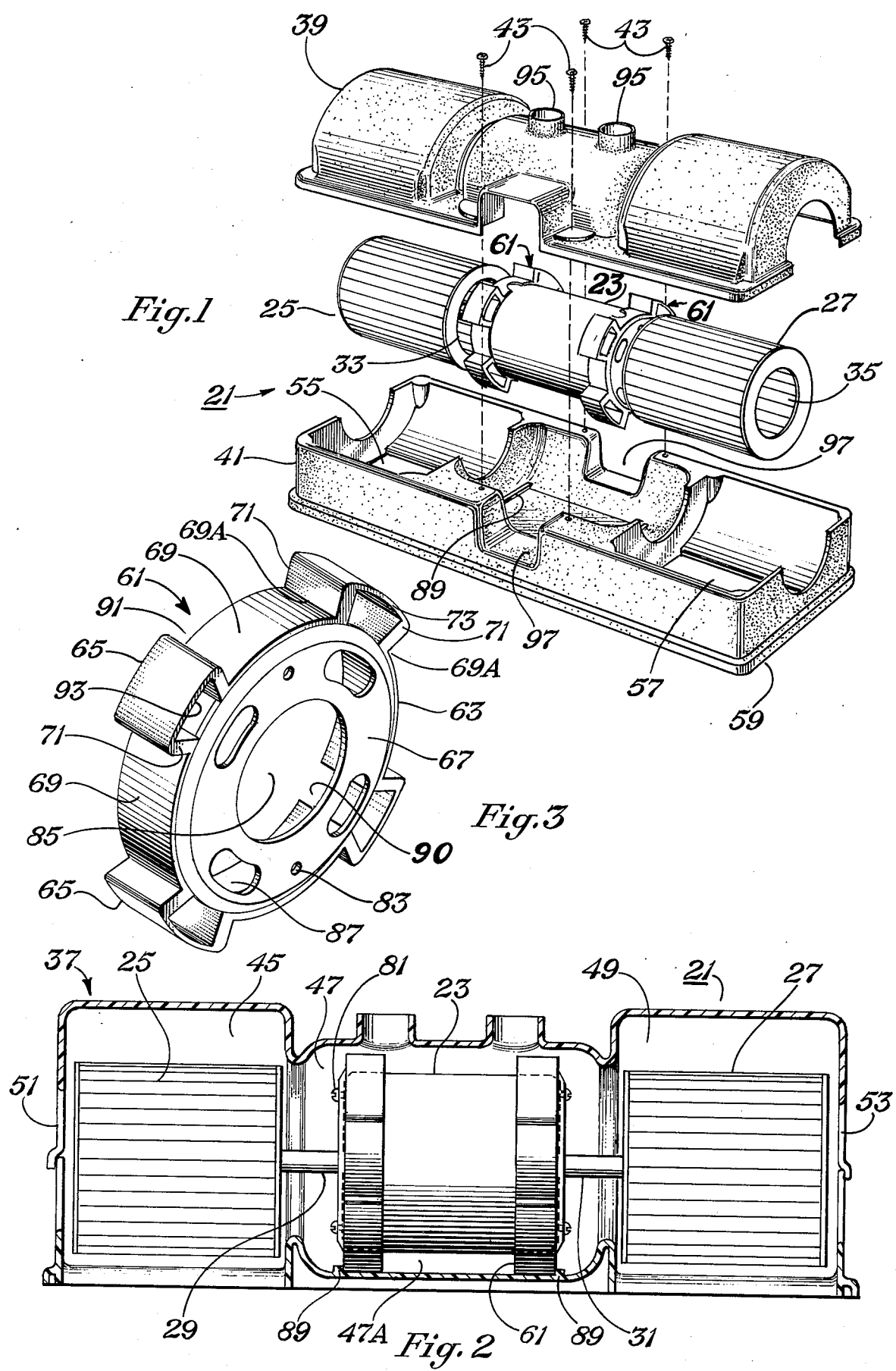

BLOWER MOTOR MOUNTING ASSEMBLY

This is a continuation, of application Ser. No. 730,858, filed Oct. 8, 1976, now abandoned.

BACKGROUND OF THE INVENTION

In U.S. Pat. No. 3,874,191, there is disclosed a blower assembly for blowing air on the evaporator coil of an air-conditioner which is employed in an automobile or truck. The blower assembly comprises dual squirrel cage blowers driven by an intermediate motor which are mounted in a two part plastic housing. The two sections of the housing are attached together and in direct engagement with the motor for mounting the motor in the housing. This mounting arrangement for the blower motor primarily is intended for use in air conditioning units installed in automobiles or trucks to be driven on city streets or highways.

SUMMARY OF THE INVENTION

It is an object of the present invention to provide a unique blower motor mounting arrangement which is particularly applicable for air conditioning units installed in farm vehicles such as tractors or other off of the road vehicles where the unit is subjected to severe vibrations or jarring motion caused by movement of the vehicle over rough terrain.

In one aspect, the mounting arrangement comprises an end support to be attached to opposite ends of a blower motor for supporting the motor in its housing. The end support comprises a cup shaped member adapted to be fitted about an end of the motor and a plurality of spaced apart legs extending radially outward from the cup shaped member for engaging the walls of the housing for supporting the motor in the housing away from the walls thereof. The end support is formed of relatively soft flexible material.

In a further aspect, each support leg comprises two spaced apart leg members which diverge from each other outward from the cup shaped member and a flexible arcuate bridge portion connecting the outer ends of the leg members for engaging the wall of the housing.

BRIEF DESCRIPTION OF THE DRAWINGS

FIG. 1 is an exploded view of a blower assembly illustrating the end supports of the present invention attached to opposite ends of the blower motor;

FIG. 2 is a cross-section of the blower assembly of FIG. 1 showing the blower motor and the blowers mounted within the two-part housing;

FIG. 3 is an enlarged perspective view of one of the end supports of FIGS. 1 and 2.

DETAILED DESCRIPTION OF THE INVENTION

Referring now to the drawings, reference numeral 21 identifies a blower assembly which is employed for blowing air on the evaporator coil of an air-conditioner. The assembly comprises a cylindrical shaped motor 23 for driving dual squirrel cage cylindrical blowers 25 and 27 which are attached to shaft members or portions 29 and 31 extending from opposite ends of the motor. Each blower is a hollow member with an intermediate wall located between its ends to which the shaft member is attached. The opposite ends of each blower are open. For example, in FIG. 1, the opening of the inner end of blower 25 is shown at 33 and the opening of the outer end of blower 27 is shown at 35. Reference is made to U.S. Pat. No. 3,874,191 for a more detailed illustration of the blowers and the manner in which they are attached to the shaft members.

The motor and blowers are mounted in a plastic blower housing identified at 37 in FIG. 2. The housing is formed of top and bottom sections 39 and 41 which are attached together by screws 43. The top and bottom sections 39, 41 are shaped such that they fit together generally in a plane parallel to the blower housing longitudinal axis, and when they are attached together three chambers 45, 47 and 49 are formed. The motor 23 includes a motor housing having a generally cylindrical portion coaxial with said shaft portions 29, 31 and having end walls integral with the cylindrical portion and disposed generally transversely of the shaft portions. The motor 23 is mounted in chamber 47 and the blowers 25 and 27 are located in chambers 45 and 49. Openings 51 and 53 are formed at the outer ends of the housing which lead to the interior of the blowers. Housing section 41 also has openings 55 and 57 formed in its flat side 59. These openings will be located adjacent the evaporator coil of the air-conditioner.

The motor 23 is mounted in the chamber by the use of two end supports 61 which are attached to the opposite end walls of the motor. The end supports are identical in structure. Referring to FIG. 3, each end support 61 comprises a body portion 63 having a generally cylindrical portion 69 disposed coaxially with a respective motor shaft portion 29, 31 and an end wall 67 disposed generally transversely of the motor shaft portion 29, 31. The body portion 63 has a concavity formed by the interior surfaces of the cylindrical portion 69 and the end wall 67, with the concavity being shaped to conformingly fit the corresponding cylindrical portion 69 and end wall 67 of the motor housing. Each end support 61 further comprises resilient support leg means which are integral with the cylindrical portion 69 of the body portion 63 and which extend radially outwardly therefrom. The end supports 61 are formed of a relatively soft flexible material and are sized such that when the blower housing top and bottom sections 39, 41 are joined, the end supports 61 are clamped thereby to resiliently support the motor 23 and the blowers 25, 27 away from the blower housing 37.

In the embodiment shown, the resilient support leg means comprises a plurality of spaced apart support legs 65, and the cylindrical portion 69 of the end support body portion 63 is provided a gap 90 for each support leg 65. Further, each support leg 65 is made up of two spaced apart leg members 71 and a flexible arcuate shaped bridge portion 73. The inner ends of the leg members 71 are integral with an end of a respective gap 90 and their outer ends are integral with and connected by a respective flexible arcuate shaped bridge portion 73. Each set of spaced apart leg members 71 diverge radially outward from each other. In assembly, the respective end support 61 is attached to the motor by way of bolts 81 which are inserted through apertures 83 formed in the end wall 67 and which are then threaded into corresponding holes formed in the end wall of the motor housing. Opening 85 allows the shaft of the motor to extend through the end support 61 while openings 87 are for cooling purposes and conform with similar openings formed in the end wall of the motor housing.

After both end supports 61 have been attached, the motor is placed in the lower chamber section 47A formed in the housing section 49 between strips 89 formed in the housing section 41. The housing section 39 then is fitted to the housing section 41 and screws 43 threaded in place to secure the housing sections 39 and 41 together and into engagement with the arcuate bridge portions 73 of the support legs 65 of the end supports 61. The arcuate bridge portions 73 conform to the shape of the wall portions of the housing sections 39 and 41 defining the chamber 47. The housing then is attached to the housing structure of the evaporator coil with the openings 55 and 57 next to the evaporator coil as shown in U.S. Pat. No. 3,874,191.

The end supports 61 are formed of a relatively soft flexible material which in the preferred embodiment is polyolefin polymer identified as TPR 1600 produced by Shell Chemical Co. They act as shock absorbers and cushion the motor and blowers against shock and yet hold them adequately in place during operation. Over rough terrain sufficient cushioning is provided to prevent breakage of the plastic housing which may otherwise occur if the housing were to directly engage the motor. In addition the end supports 61 act as positioning devices in that they enable the motor to be readily inserted in place during assembly of the blower unit. Also, the spaces 91 formed between the legs 65 and the spaces 93 formed between the leg members 71 allow air to flow from openings 95 and 97 formed in the intermediate portion of the housing into the inside openings of the blowers to increase the air output of the blowers.

In operation the motor 23 is energized to rotate the blowers 25 and 27 to draw air inward through openings 51 and 53 and through openings 95 and 97 into opposite ends of the blowers. The air then flows out of the blowers through the spaces formed between their blades and through the openings 55 and 57 onto the coil of the evaporator of the air-conditioner.

What is claimed is:

1. A blower assembly comprising:
  a. a blower housing having a longitudinal axis and made up of a top section and a bottom section which fit together generally in a plane parallel to said longitudinal axis;
  b. a motor having shaft portions extending from opposite ends thereof, with a blower attached to each shaft portion, and a motor housing having a generally cylindrical portion coaxial with said shaft portions and end walls integral with the cylindrical portion and disposed generally transversely of said shaft portions;
  c. an end support attached to each end wall of said motor housing for supporting said motor and blowers in said blower housing, each end support comprising:
    i. a body portion having a generally cylindrical portion disposed coaxially with a respective said motor shaft portion and an end wall disposed generally transversely of said motor shaft portion,
    ii. said body portion further having a concavity formed by interior surfaces of said cylindrical portion and said respective end wall, with said concavity shaped to conformingly fit the corresponding cylindrical portions and end walls of said motor housing,
    iii. resilient support leg means integral with the cylindrical portion of said body portion and extending radially outwardly therefrom,
    iv. said end supports being formed of a relatively soft flexible material and sized such that when said blower housing sections are joined, said end supports are clamped thereby to resiliently support said motor and blowers away from said blower housing.

2. The blower assembly of claim 1 wherein:
  a. said resilient support leg means comprises a plurality of spaced apart support legs,
  b. said cylindrical portion of each said end support body portion is provided a gap for each said support leg,
  c. each said support leg comprises two spaced apart leg members each of which is integral with an end of a respective gap and which diverge outward from each other, and a flexible arcuate shaped bridge portion connecting the outer ends of said leg members of a said respective support leg.

3. An end support for attachment to the housing of a blower motor for supporting said motor in a blower housing, with said blower motor having shaft portions extending from opposite ends thereof, with said motor housing having a generally cylindrical portion coaxial with said shaft portions and end walls integral with the cylindrical portion and disposed generally transversely of said shaft portions, said end support comprising:
  i. a body portion having a generally cylindrical portion disposed coaxially with a respective said motor shaft portion and an end wall disposed generally transversely of a respective said motor shaft portion,
  ii. said body portion further having a concavity formed by interior surfaces of said cylindrical portion and said respective end wall, with said concavity shaped to conformingly fit the corresponding cylindrical and end wall portions of said motor housing,
  iii. resilient support leg means comprising a plurality of spaced apart support legs integral with the cylindrical portion of said body portion and extending radially outwardly therefrom, with said cylindrical portion being provided a gap for each said support leg, and with each said support leg comprising two spaced apart leg members each of which is integral with an end of a respective said gap and which diverge outward from each other with a flexible arcuate shaped bridge portion connecting the outer ends of said leg members of a respective said support leg,
  iv. said end support being formed of a relatively soft flexible material and sized such that said end support may be clamped by said blower housing so as to resiliently support said motor in said blower housing.

* * * * *